United States Patent
Li et al.

(10) Patent No.: US 11,363,271 B2
(45) Date of Patent: Jun. 14, 2022

(54) METHOD FOR VIDEO FRAME INTERPOLATION, RELATED ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Chao Li, Beijing (CN); Yukang Ding, Beijing (CN); Dongliang He, Beijing (CN); Fu Li, Beijing (CN); Hao Sun, Beijing (CN); Shilei Wen, Beijing (CN); Hongwu Zhang, Beijing (CN); Errui Ding, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/125,370

(22) Filed: Dec. 17, 2020

(65) Prior Publication Data

US 2021/0360252 A1    Nov. 18, 2021

(30) Foreign Application Priority Data

May 15, 2020 (CN) .......................... 202010412447.5

(51) Int. Cl.
*H04N 19/132* (2014.01)
*H04N 19/172* (2014.01)
(Continued)

(52) U.S. Cl.
CPC ......... *H04N 19/132* (2014.11); *G06K 9/6256* (2013.01); *G06N 3/0454* (2013.01); *H04N 19/172* (2014.11)

(58) Field of Classification Search
CPC .......................... H04N 19/132; H04N 19/172
See application file for complete search history.

(56) References Cited

U.S. PATENT DOCUMENTS

2002/0118690 A1    8/2002  Calvignac et al.
2014/0226901 A1*   8/2014  Spracklen ............ H04N 19/164
                                                            382/167
(Continued)

FOREIGN PATENT DOCUMENTS

CN    108322685 A    7/2018
CN    109922231 A    6/2019
(Continued)

OTHER PUBLICATIONS

Chinese Patent Application No. 202010412447.5 Office Action dated Jul. 6, 2021, 8 pages.

(Continued)

*Primary Examiner* — Jerry T Jean Baptiste
(74) *Attorney, Agent, or Firm* — Lathrop GPM LLP

(57) ABSTRACT

A method for video frame interpolation, a related electronic device and a storage medium is disclosed. A video is obtained. An $(i-1)^{th}$ frame and an $i^{th}$ frame of the video are obtained. Visual semantic feature maps and depth maps of the $(i-1)^{th}$ frame and the $i^{th}$ frame are obtained. Frame interpolation information is obtained based on the visual semantic feature maps and the depth maps. An interpolated frame between the $(i-1)^{th}$ frame and the $i^{th}$ frame is generated based on the frame interpolation information and the $(i-1)^{th}$ frame and is inserted between the $(i-1)^{th}$ frame and the $i^{th}$ frame.

17 Claims, 11 Drawing Sheets

(51) Int. Cl.
   *G06K 9/62*     (2022.01)
   *G06N 3/04*     (2006.01)

(56) References Cited

U.S. PATENT DOCUMENTS

2021/0272236 A1\*  9/2021  Wang .................... G06N 3/08
2021/0398294 A1\*  12/2021  Cui ...................... G06T 7/174

FOREIGN PATENT DOCUMENTS

CN      110324664 A     10/2019
CN      111083417 A     4/2020

OTHER PUBLICATIONS

Chinese Patent Application No. 202010412447.5 English translation of Office Action dated Jul. 6, 2021, 7 pages.
Zang, Q. et al. "Video interpolation based on deep learning"; vol. 9, No. 4; Intelligent Computerand Applications; Jul. 2019, 7 pages.
Chen, H. et al. "Nonlinearity compensated smooth frame insertion for motion-blur reduction in LCD" 2005 IEEE 7th Workshop on Multimedia Signal Processing, 4 pages.
Chinese Patent Application No. 202010412447.5 Office Action dated Oct. 11, 2021, 7 pages.
Chinese Patent Application No. 202010412447.5 English translation of Office Action dated Oct. 11, 2021, 8 pages.
Chinese Patent Application No. 202010412447.5 Notice of Allowance dated Dec. 22, 2021, 4 pages.
Chinese Patent Application No. 202010412447.5 English translation of Notice of Allowance dated Dec. 22, 2021, 5 pages.

\* cited by examiner

METHOD FOR VIDEO FRAME INTERPOLATION, RELATED ELECTRONIC DEVICE AND STORAGE MEDIUM

CROSS REFERENCE TO RELATED APPLICATIONS

This application claims priority and benefits to Chinese Application No. 202010412447.5, filed on May 15, 2020, the entire content of which is incorporated herein by reference.

TECHNICAL FIELD

The present disclosure relates to a field of video processing technologies, particular to a field of video frame interpolation technologies, and more particular to a method and a device for video frame interpolation, an electronic device and a storage medium.

BACKGROUND

With the rise of the mobile Internet, users would prefer to store and forward videos instead of text or pictures. Nowadays, video has become a mainly-used carrier of user-generated content.

SUMMARY

Embodiments of the disclosure provide a method for video frame interpolation, a related electronic device and a related non-transitory computer-readable storage medium.

The method for video frame interpolation includes:
obtaining a video;
obtaining an $(i-1)^{th}$ frame and an $i^{th}$ frame of the video, where i is a positive integer;
obtaining visual semantic feature maps and depth maps of the $(i-1)^{th}$ frame and the $i^{th}$ frame;
obtaining frame interpolation information based on the visual semantic feature maps and the depth maps of the $(i-1)^{th}$ frame and the $i^{th}$ frame; and
inserting an interpolated frame between the $(i-1)^{th}$ frame and the $i^{th}$ frame by obtaining the interpolated frame based on the frame interpolation information and the $(i-1)^{th}$ frame.

The electronic device includes:
at least one processor; and
a memory, communicatively coupled to the at least one processor;
in which the memory is configured to store instruction executable by the at least one processor, and when the instructions are executed by the at least one processor, the at least one processor is configured to execute a method for video frame interpolation described above.

The non-transitory computer-readable storage medium has computer instructions stored thereon. The computer instructions are configured to cause a computer to execute a method for video frame interpolation described above.

It should be understood that this part is not intended to identify key or important features of embodiments of the disclosure, nor to limit the scope of the disclosure. Other features of the disclosure will be easily understood by the following description.

BRIEF DESCRIPTION OF THE DRAWINGS

The accompanying drawings are used to better understand the technical solution and do not constitute a limitation to the disclosure.

DETAILED DESCRIPTION

Figure 1:
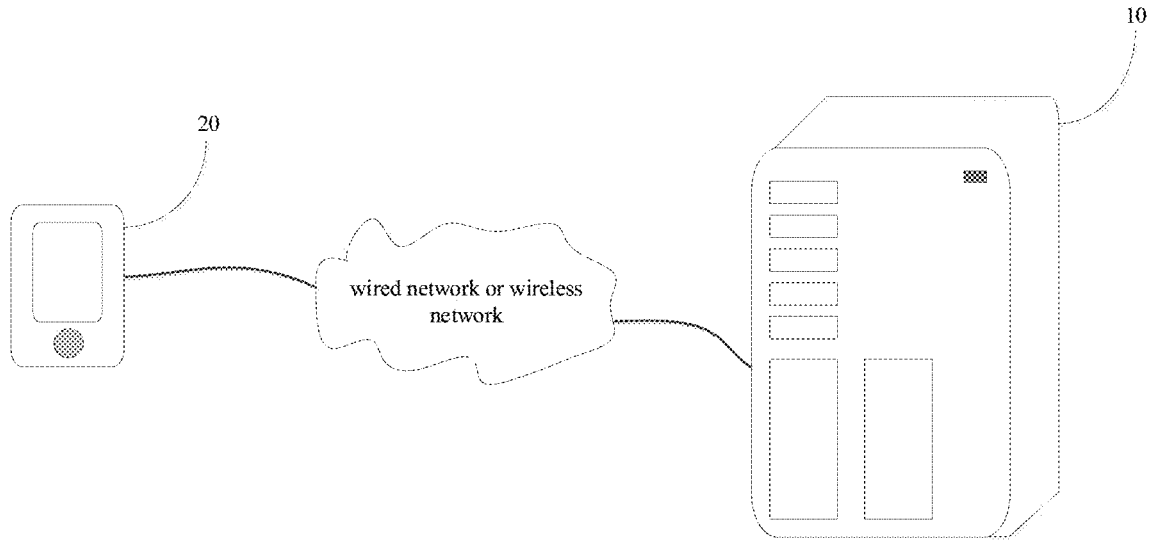
FIG. 1 is a schematic diagram illustrating an implementation environment according to embodiments of the disclosure.

Exemplary embodiments of the disclosure will be described with reference to the accompanying drawings, including various details of embodiments of the disclosure to facilitate understanding the disclosure, which should be considered as merely exemplary. Therefore, those of ordinary skill in the art should realize that various changes and modifications can be made to the embodiments described herein without departing from the scope and spirit of the disclosure. In addition, for clarity and conciseness, descriptions of well-known functions and structures are omitted in the disclosure.

Nowadays, video has become a mainly-used carrier of user-generated content. However, due to limitations of video recording devices, most users can only record videos with a frame rate (from 24 to 30 fps) which is far from the high frame rate (such as 60 fps or 120 fps) thereby reducing viewing experience of videos.

An existing video frame interpolation technology can interpolate some intermediate frames between video frames, thereby increasing the frame rate of the video, enabling a smooth viewing experience of the video, reducing jumping and jittering, and greatly improving user experience. In related arts, the video frame interpolation may be implemented through a method based on optical flow and motion compensation. However, this method has low computational efficiency and is unable to solve a blocking problem. In addition, in cases that a significant change occurs in content of pictures, this method has a poor effect of the video frame interpolation.

Embodiments of the disclosure provide a method and a device for video frame interpolation, an electronic device and a non-transitory computer-readable storage medium to solve a problem, existing in an existing frame interpolation method based on optical flow and motion compensation, that the calculation efficiency is low, it is unable to solve a blocking problem, and the frame interpolation effect is poor in a situation of large changes in frame content.

The method and the device for video frame interpolation, the related electronic device, and the related storage medium according to embodiments of the disclosure will be described below with reference to the accompanying drawings.

In embodiments of the disclosure, the method for video frame interpolation is proposed to solve a problem existing in the related art that an existing frame interpolation has low computational efficiency, is unable to solve a blocking problem, and having a poor frame interpolation effect when a great change occurs in content of pictures.

In the method for video frame interpolation according to embodiments of the disclosure, frame interpolation information is obtained based on respective visual semantic feature maps and respective depth maps of an $(i-1)^{th}$ frame and $i^{th}$ frame of a video, and inserting an interpolated frame into the $(i-1)^{th}$ frame and the $i^{th}$ frame by obtaining the interpolated frame between the $(i-1)^{th}$ frame and the $i^{th}$ frame based on the information of the interpolated frame and the $(i-1)^{th}$ frame. Therefore, an existing problem may be solved and smoothness of playing the video is improved.

FIG. 1 is a schematic diagram illustrating an implementation scenario according to embodiments of the disclosure. The implementation scenario may include a video providing device 10 and a display device 20. The video providing device 10 may be a digital universal optical disc player, an audio-visual CD player, a server, a U disk or a smart hard disk. The display device 20 may be a video processing device having a display function, such as a mobile phone, a tablet computer, a desktop computer, or a television. A communication connection is established between the video providing device 10 and the display device 20. The communication connection may be at least one of a wireless network connection and a wired network connection. The wireless network connection may be, for example, a communication connection using a mobile communication network, Bluetooth, Zigbee, or wireless fidelity (WIFI). The wired network connection may be, for example, a communication connection using twisted pair, coaxial cable, optical fiber, network cable, or data cable (such as USB, IEEE1394, serial port or parallel port).

It should be noted that, when the display device 20 is described in embodiments as an electronic device with a built-in camera, such as a mobile phone or a tablet computer, the display device 20 may capture and save a video through the built-in camera. The display device 20 can save the captured video in its own storage space. The storage space is not limited to physical storage space, such as a hard disk. The storage space can also be the storage space (cloud storage space) of a network hard disk connected to the display device 20.

The method for video frame interpolation according to embodiments of the disclosure may be executed by an electronic device. The electronic device may be a video processing device which may be the video providing device 10 or the display device 20 as illustrated in the implementation scenario of FIG. 1. In cases that the video processing device is the video providing device 10 illustrated in the implementation scenario of FIG. 1, the video processing device may be configured to obtain the video, perform frame interpolation processing on the video to obtain a processed video, and send the processed video to the display device 20. The display device 20 may be configured to play the processed video. In cases that the video processing device is the display device 20 illustrated in the implementation scenario of FIG. 1, in some embodiments, the video processing device may be configured to obtain a video from the video providing device 10, perform the frame interpolation processing on the video to obtain a processed video, and play the processed video. Further, in cases that the video processing device is the display device 20 illustrated in the implementation scenario of FIG. 1, in some embodiments, the video processing device may be configured to obtain the video through the built-in camera, perform the frame interpolation processing on the video to obtain the processed video, and display the processed video through its own display.

In embodiments of the disclosure, the electronic device may be provided with a processing component, a storage component, and a driving component. In some embodiments, the driving component and the processing component can be integrated together. The storage component can be configured to store an operating system, application programs, or other program modules. The processing component can be configured to implement the method for video frame interpolation provided according to embodiments of the disclosure by executing the application programs stored in the storage component.

Figure 2:
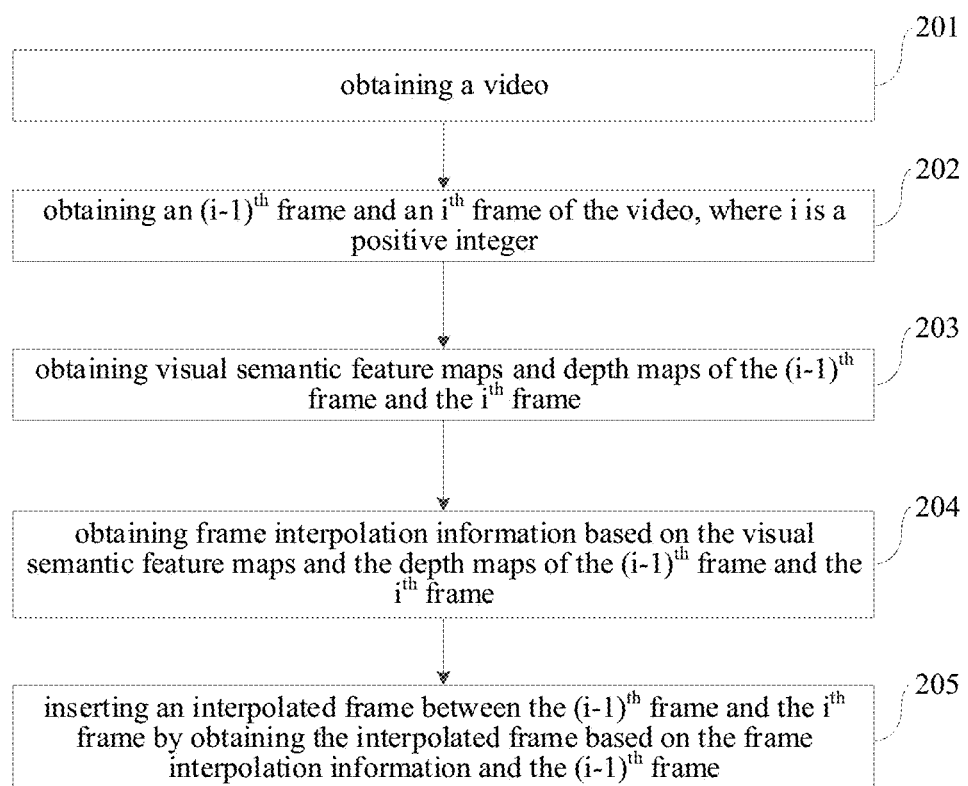
FIG. 2 is a flowchart illustrating a method for video frame interpolation according to embodiments of the disclosure.

FIG. 2 is a flowchart illustrating a method for video frame interpolation according to embodiments of the disclosure.

The method for video frame interpolation according to embodiments of the disclosure can be executed by a device for video frame interpolation according to embodiments of the disclosure. The device can be integrated in an electronic device to generate frame interpolation information based on respective visual semantic feature maps and respective depth maps of an $(i-1)^{th}$ frame and an $i^{th}$ frame of the video, generate an interpolated frame between the $(i-1)^{th}$ frame and the $i^{th}$ frame based on the frame interpolation information and the $(i-1)^{th}$ frame, and insert the interpolated frame between the $(i-1)^{th}$ frame and the $i^{th}$ frame.

As illustrated in FIG. 2, the method for video frame interpolation may include the following.

At block 201, a video is obtained. It should be noted that, the obtained video may be a target video and the user would like to perform the video frame interpolation on the target video to improve the playback smoothness.

In some embodiments of the disclosure, the electronic device may be configured to obtain the target video. In cases that the electronic device is the video providing device, the electronic device can be configured to obtain the target video from videos stored by itself. In cases that the electronic device is a display device, in some embodiments, the electronic device can be configured to obtain the target video from the video providing device. For example, the electronic device may be configured to download the target video from the video providing device based on a uniform resource locator (URL) corresponding to the target video. Further, in cases that the electronic device is a display device, in some embodiments, the electronic device may be configured to store the target video such that the electronic device may obtain the target video from videos stored by itself, or the electronic device can be configured to capture the target video through a built-in camera.

At block 202, an $(i-1)^{th}$ frame and an $i^{th}$ frame are obtained from the video, where i is a positive integer. It can be understood that, the $(i-1)^{th}$ frame and the $i^{th}$ frame are selected freely from the video and the $(i-1)^{th}$ frame is adjacent to the $i^{th}$ frame.

In detail, the target video may include multiple frames, i.e., multiple single-frame images. In response to obtaining the target video, the electronic device may be configured to obtain two adjacent frames from the target video by executing a preset application, e.g., the $(i-1)^{th}$ frame and the $i^{th}$ frame.

At block 203, a visual semantic feature map and a depth map of the $(i-1)^{th}$ frame are obtained and a visual semantic feature map and a depth map of the $i^{th}$ frame are obtained.

In some embodiments of the disclosure, the visual semantic feature map of the $(i-1)^{th}$ frame and the visual semantic feature map of the $i^{th}$ frame can be obtained through a preset semantic segmentation network. The preset semantic segmentation network may be calibrated based on actual conditions. For example, the preset semantic segmentation network may be trained and designed using annotation data of semantic segmentation, which is not limited in the disclosure. It should be noted that, the semantic segmentation is to segment a target based on the semantic information of each pixel. Pixels with the same semantics are given the same color. Therefore, the target can be divided into different regions and the content can be identified.

Figure 3:
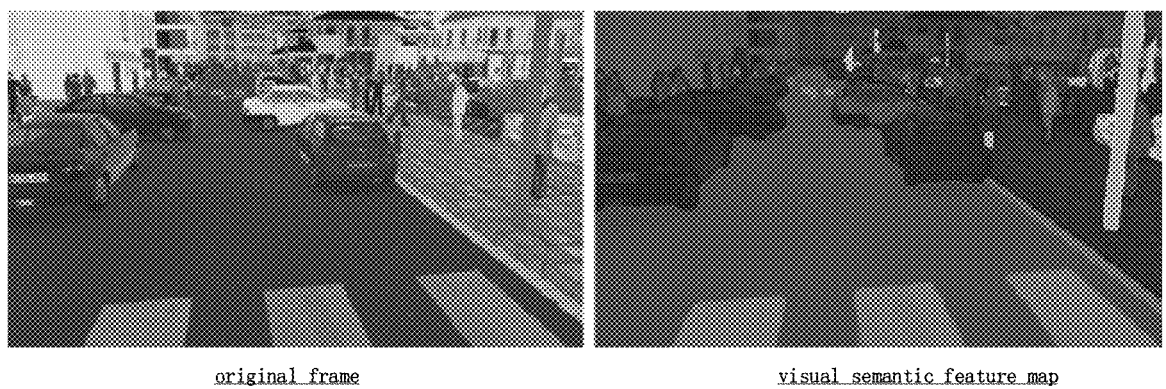
FIG. 3 is a schematic diagram illustrating visual semantic features according to embodiments of the disclosure.

In detail, the obtained $(i-1)^{th}$ frame and the $i^{th}$ frame can be input to the preset semantic segmentation network. The preset semantic segmentation network may be configured to extract semantic segmentation information of each object and each scene contained in the $(i-1)^{th}$ frame and the $i^{th}$ frame respectively to output visual semantic feature maps having the same size with original frames (i.e., $(i-1)^{th}$ frame and the $i^{th}$ frame). An element of the visual semantic feature map is a semantic label of a pixel at a corresponding position in the original frame. For example, as illustrated in FIG. 3, all cars in the original frame are painted blue, all persons are yellow, all trees are green, and all buildings are red.

It should be noted that outputting the visual semantic feature map of the same size as the original frame in embodiments is to enable the position of segmentation information (result) in the visual semantic feature map to correspond to the pixel positions in the original frame. For example, as illustrated in FIG. 3, positions of buildings in the original frame correspond to positions of pixels of red buildings in the visual semantic feature map.

In some embodiments of the disclosure, the depth map of the $(i-1)^{th}$ frame and the depth map of the $i^{th}$ frame can be obtained through a preset depth network. The depth network may be calibrated based on actual conditions. For example, the preset depth network may be trained and designed using annotation data of depth information, which is not limited in the disclosure.

Figure 4:
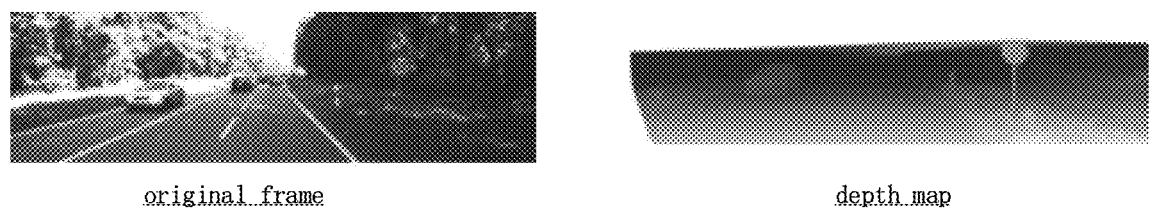
FIG. 4 is a schematic diagram illustrating depth information according to embodiments of the disclosure.

In detail, the obtained $(i-1)^{th}$ frame and the $i^{th}$ frame can be input to the preset depth network. The preset depth network may be configured to extract the depth information of each object contained in the $(i-1)^{th}$ frame and the $i^{th}$ frame respectively to obtain depth maps having the same size as the original frames (i.e., the $(i-1)^{th}$ frame and the $i^{th}$ frame). An element in the depth map is a depth (a distance from the object to the camera) of a pixel at a corresponding position in the original frame. For example, as illustrated in FIG. 4, different colors correspond to different depths.

It should be noted that outputting the depth map of the same size as the original frames in embodiments is to enable the depth of each object in the depth map to correspond to the pixel positions of each object in the original frame.

At block 204, frame interpolation information is generated based on the respective visual semantic feature maps and the respective depth maps of the $(i-1)^{th}$ frame and the $i^{th}$ frame.

At block 205, an interpolated frame between the $(i-1)^{th}$ frame and the $i^{th}$ frame is generated based on the frame interpolation information and the $(i-1)^{th}$ frame, and the interpolated frame is inserted between the $(i-1)^{th}$ frame and the $i^{th}$ frame.

In some embodiments of the disclosure, the respective visual semantic feature maps and the respective depth maps of the $(i-1)^{th}$ frame and the $i^{th}$ frame can be spliced and integrated together and input to a preset frame interpolation network to generate the frame interpolation information. The preset frame interpolation network can be calibrated based on actual conditions. For example, the preset frame interpolation network can be formed based on a deep convolutional network, which is not limited here.

In detail, in response to obtaining the visual semantic feature maps and the depth maps of the $(i-1)^{th}$ frame and the $i^{th}$ frame respectively, the electronic device may be configured to splice and integrate the visual semantic feature maps and the depth maps of the $(i-1)^{th}$ frame and the $i^{th}$ frame to obtain spliced and integrated information. The spliced and integrated information are input the preset frame interpolation network to generate the frame interpolation information. The electronic device is further configured to generate the interpolated frame between the $(i-1)^{th}$ frame and the $i^{th}$ frame based on the frame interpolation information the $(i-1)^{th}$ frame, and insert the interpolated frame between the $(i-1)^{th}$ frame and the $i^{th}$ frame.

It should be noted that in some embodiments of the disclosure, using the preset frame interpolation network to generate the frame interpolation information may provide at least the following advantages.

Since the preset frame interpolation network is consisted of deep convolutional network, traditional optical flow estimation, motion compensation or other complex calculations are not contained, thereby increasing calculation efficiency.

In addition, with the preset frame interpolation network, front-back blocking relationships of objects in the video can be obtained based on the visual semantic feature maps and the depth maps, thereby effectively solving the blocking problem.

Furthermore, since the preset frame interpolation network is consisted of deep convolutional network, the receptive field is large. Further, together with the visual semantic and the depth, the preset frame interpolation network may be applicable to a situation of large changes in motion.

Moreover, the visual semantic feature map can help the preset frame interpolation network to deal with scene changes, such as camera switching, indoor and outdoor switching.

In embodiments of the disclosure, the video is obtained, the $(i-1)^{th}$ frame and the $i^{th}$ frame are obtained from the video, the respective visual semantic feature maps and the respective depth maps of the $(i-1)^{th}$ frame and the $i^{th}$ frame are obtained, the frame interpolation information is obtained based on the respective visual semantic feature maps and the respective depth maps of the $(i-1)^{th}$ frame and the $i^{th}$ frame, and the interpolated frame is inserted between the $(i-1)^{th}$ frame and the $i^{th}$ frame by generating the interpolated frame based on the frame interpolation information and the $(i-1)^{th}$ frame. Therefore, the video frame interpolation is performed based on the visual semantic feature maps and the depth maps of the frames of the video, thereby improving the calculation efficiency, being able to solve the blocking problem and occurrence of large changes in frames, and improving the frame interpolation effect.

In order to clearly illustrate embodiments of the disclosure, in some embodiments of the disclosure, generating the frame interpolation information based on the respective visual semantic feature maps and the respective depth maps of the $(i-1)^{th}$ frame and the $i^{th}$ frame may include generating a visual semantic feature map of the interpolated frame based on the respective visual semantic feature maps of the $(i-1)^{th}$ frame and the $i^{th}$ frame, generating a depth map of the interpolated frame based on the respective depth maps of the $(i-1)^{th}$ frame and the $i^{th}$ frame, and generating the frame interpolation information based on the visual semantic feature map of the interpolated frame and the depth map of the interpolated frame.

In detail, in response to or after obtaining the respective visual semantic feature maps and the respective depth maps of the $(i-1)^{th}$ frame and the $i^{th}$ frame, the electronic device may be configured to splice and integrate the respective visual semantic feature maps and the respective depth maps of the $(i-1)^{th}$ frame and the $i^{th}$ frame together and input to the preset frame interpolation network. The frame interpolation network may be configured to extract the visual semantic feature map of the $(i-1)^{th}$ frame, the visual semantic feature map of the $i^{th}$ frame, the depth map oft the $(i-1)^{th}$ frame, and the depth map of the $i^{th}$ frame. Further, the frame interpolation network may be configured to generate the visual semantic feature map of the interpolated frame (i.e., the visual semantic feature map of a frame to be inserted between the $(i-1)^{th}$ frame and the $i^{th}$ frame) based on the visual semantic feature maps of the $(i-1)^{th}$ frame and the $i^{th}$ frame, and generate the depth map of the interpolated frame (i.e., the depth map of a frame to be inserted between the $(i-1)^{th}$ frame and the $i^{th}$ frame) based on the depth maps of the $(i-1)^{th}$ frame and the $i^{th}$ frame. Further, the frame interpolation network may be configured to generate the frame interpolation information based on the visual semantic feature map and the depth map of the interpolated frame. Therefore, by obtaining the visual semantic feature map and the depth map of a frame to be inserted between the $(i-1)^{th}$ frame and the $i^{th}$ frame, the calculation efficiency may be improved, and a condition of scene conversion may be solved since the visual semantic feature map of the interpolated frame is obtained separately.

In order to further improve the effect of the video frame interpolation to make playback of the video smooth after the video frame interpolation, in some embodiments of the disclosure, the method for video frame interpolation may further include obtaining respective deep feature maps of the $(i-1)^{th}$ frame and the $i^{th}$ frame, and obtaining the deep feature map of the interpolated frame based on the respective deep feature maps of the $(i-1)^{th}$ frame and the $i^{th}$ frame. The frame interpolation information may also include the deep feature map of the interpolated frame. The deep feature map can include not only overall information of the corresponding frame, but also deep features of detail information.

In some embodiments of the disclosure, the respective deep feature maps of the $(i-1)^{th}$ frame and the $i^{th}$ frame can be obtained through a preset deep neural network. The preset deep neural network can be calibrated based on actual conditions. For example, the preset deep neural network may be trained and designed by using annotation data of deep information, which is not limited in the disclosure.

In detail, the obtained $(i-1)^{th}$ frame and $i^{th}$ frame can be input into the preset deep neural network. The preset deep neural network may be configured to extract deep features of each object and each scene contained in the $(i-1)^{th}$ frame and the $i^{th}$ frame to output deep feature maps having the same size as the original frames (i.e., the $(i-1)^{th}$ frame and the $i^{th}$ frame), and generate the deep feature map based on the respective deep feature maps of the $(i-1)^{th}$ frame and the $i^{th}$ frame. Since the deep feature map includes not only the overall information of the corresponding frame, but also the deep features of detail information, the effect of the video frame interpolation may be further increased and the quality of video is improved while improving smoothness of playback of the video subjected to the video frame interpolation.

Figure 5:
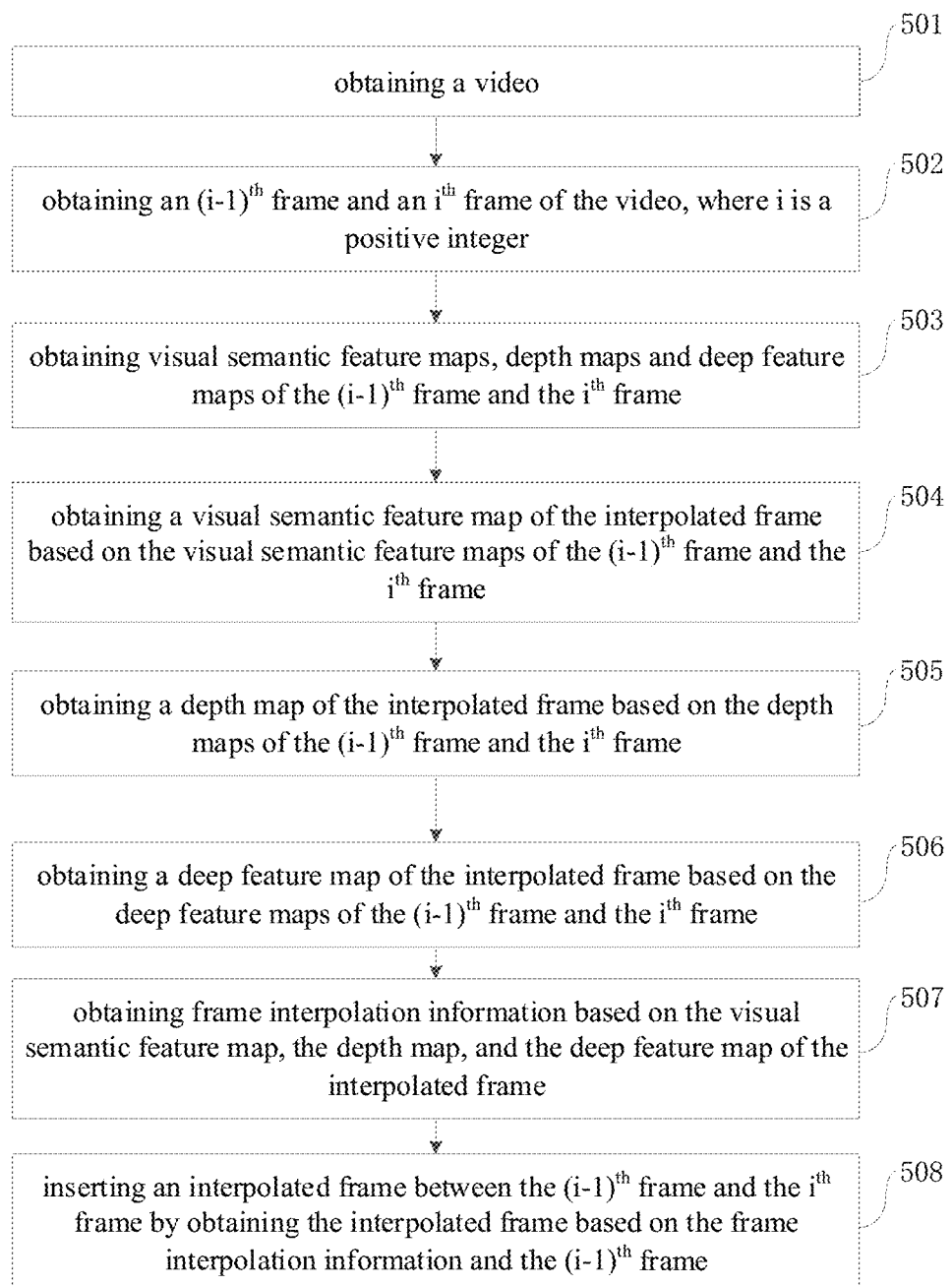
FIG. 5 is a flowchart illustrating a method for video frame interpolation according to embodiments of the disclosure.

In order to clearly illustrate the disclosure, embodiments of the disclosure further provide a method for video frame interpolation. FIG. 5 is a flowchart illustrating a method for video frame interpolation according to embodiments of the disclosure.

As illustrated in FIG. 5, the method for video frame interpolation may include the following.

At block 501, a video is obtained. The obtained video may be a target video and the user would like to perform the video frame interpolation on the target video to improve the playback smoothness.

At block 502, an $(i-1)^{th}$ frame and an $i^{th}$ frame are obtained from the video, where i is a positive integer. It can be understood that, the $(i-1)^{th}$ frame and the $i^{th}$ frame are selected freely from the video and the $(i-1)^{th}$ frame is adjacent to the $i^{th}$ frame.

In detail, the target video may include multiple frames, i.e., multiple single-frame images. In response to or after obtaining the target video, the electronic device may be configured to obtain two adjacent frames from the target video by executing a preset application, e.g., the $(i-1)^{th}$ frame and the $i^{th}$ frame.

At block 503, respective visual semantic feature maps, respective depth maps and respective deep feature maps of the $(i-1)^{th}$ frame and the $i^{th}$ frame are obtained.

In detail, the electronic device may be configured to input the obtained $(i-1)^{th}$ frame and $i^{th}$ frame to a preset semantic segmentation network. The preset semantic segmentation network may be configured to extract the sematic segmentation information of each object and each scene contained in the $(i-1)^{th}$ frame and the $i^{th}$ frame to output the visual semantic feature maps having the same size as the original frames (i.e., $(i-1)^{th}$ frame and the $i^{th}$ frame). The electronic device may be configured to input the obtained $(i-1)^{th}$ frame and $i^{th}$ frame to a preset depth network. The preset depth network may be configured to extract depth information of each object contained in the $(i-1)^{th}$ frame and the $i^{th}$ frame to output the depth maps having the same size as the original frames (i.e., the $(i-1)^{th}$ frame and the $i^{th}$ frame). An element of the depth map is the depth information (a distance from the object to the camera) of a pixel at a corresponding position in the original frame. The electronic device may be configured to input the obtained $(i-1)^{th}$ frame and $i^{th}$ frame to a preset deep neural network. The preset deep neural network may be configured to extract deep features of each object and each scene contained in the $(i-1)^{th}$ frame and the $i^{th}$ frame to output the deep feature maps having the same size as the original frames (i.e., the $(i-1)^{th}$ frame and the $i^{th}$ frame).

At block 504, a visual semantic feature map of an interpolated frame is generated based on the respective visual semantic feature maps of the $(i-1)^{th}$ frame and the $i^{th}$ frame.

In detail, the visual semantic feature map of the $(i-1)^{th}$ frame and the visual semantic feature map of the $i^{th}$ frame may be input to the preset frame interpolation network to generate the visual semantic feature map of the interpolated frame, that is, the visual semantic feature map of a frame between the $(i-1)^{th}$ frame and the $i^{th}$ frame. The method may be applicable to a situation of scene change since the visual semantic feature map of the interpolated frame is obtained separately.

At block 505, a depth map of the interpolated frame is generated based on the depth map of the $(i-1)^{th}$ frame and the depth map of the $i^{th}$ frame.

In detail, the respective depth maps of the $(i-1)^{th}$ frame and the $i^{th}$ frame may be input to the preset frame interpolation network to generate the depth map of the interpolated frame, that is, the depth map of a frame between the $(i-1)^{th}$ frame and the $i^{th}$ frame.

At block 506, a deep feature map of the interpolated frame is generated based on the deep feature map of the $(i-1)^{th}$ frame and the deep feature map of the $i^{th}$ frame.

In detail, the respective deep feature maps of the $(i-1)^{th}$ frame and the $i^{th}$ frame may be input to the preset frame interpolation network to generate the deep feature map of the interpolated frame, that is, the deep feature map of a frame between the $(i-1)^{th}$ frame and the $i^{th}$ frame. Since the deep feature map of the interpolated frame is obtained separately, the method may be applicable to obtain the overall information and detail information of each object and each scene contained in frames of the video, thereby improving the effect of the video frame interpolation.

At block 507, frame interpolation information is generated based on the visual semantic feature map, the depth map, and the deep feature map of the interpolated frame.

In order to improve the efficiency of the video frame interpolation, in some embodiments of the disclosure, the respective visual semantic feature maps, the respective depth maps, and the respective deep feature maps of the $(i-1)^{th}$ frame and the $i^{th}$ frame can be spliced and integrated together and input to the preset frame interpolation network to generate the frame interpolation information.

At block 508, an interpolated frame between the $(i-1)^{th}$ frame and the $i^{th}$ frame is generated based on the frame interpolation information and the $(i-1)^{th}$ frame, and the interpolated frame is inserted between the $(i-1)^{th}$ frame and the $i^{th}$ frame.

In some embodiments of the disclosure, the video is obtained, the $(i-1)^{th}$ frame and the $i^{th}$ frame are obtained, the respective visual semantic feature maps, the respective depth maps and the respective deep feature maps of the $(i-1)^{th}$ frame and the $i^{th}$ frame are obtained, the frame interpolation information is generated based on the respective visual semantic feature maps, the respective depth maps and the respective deep feature maps of the $(i-1)^{th}$ frame and the $i^{th}$ frame, the interpolated frame between the $(i-1)^{th}$ frame and the $i^{th}$ frame is generated based on the frame interpolation information and the $(i-1)^{th}$ frame, and the interpolated frame is inserted between the $(i-1)^{th}$ frame and the $i^{th}$ frame. Therefore, by performing the frame interpolation on the video based on the visual semantic feature maps and the depth maps of the frames in the video, the calculation efficiency may be improved. In addition, a blocking problem and a situation of frame content change may be solved, thereby improving the effect of the frame interpolation, increasing the smoothness of the playback of the video and increasing the quality of the video.

In order to improve the accuracy of the video frame interpolation while improving the effect of video frame interpolation and making the frames in the video subjected to the frame interpolation coherent, in some embodiments of the disclosure, the frame interpolation information can be generated through a frame interpolation model. The frame interpolation information may be trained, which is not limited in the disclosure.

In some embodiments of the disclosure, training and generating the frame interpolation model can be performed by a related server. The related server may be a cloud server or a computer host. A communication connection may be established between the related server and the electronic device configured to execute the method for video frame interpolation according to embodiments of the disclosure. The communication connection may be at least one of a wireless network connection and a wired network connection. The server can send a trained frame interpolation model to the electronic device so that the electronic device can call the trained frame interpolation model when needed, thereby greatly reducing the computing pressure of the electronic device. In addition, by performing the video frame interpolation task through the frame interpolation model, the accuracy of video frame interpolation can also be improved.

Figure 6:
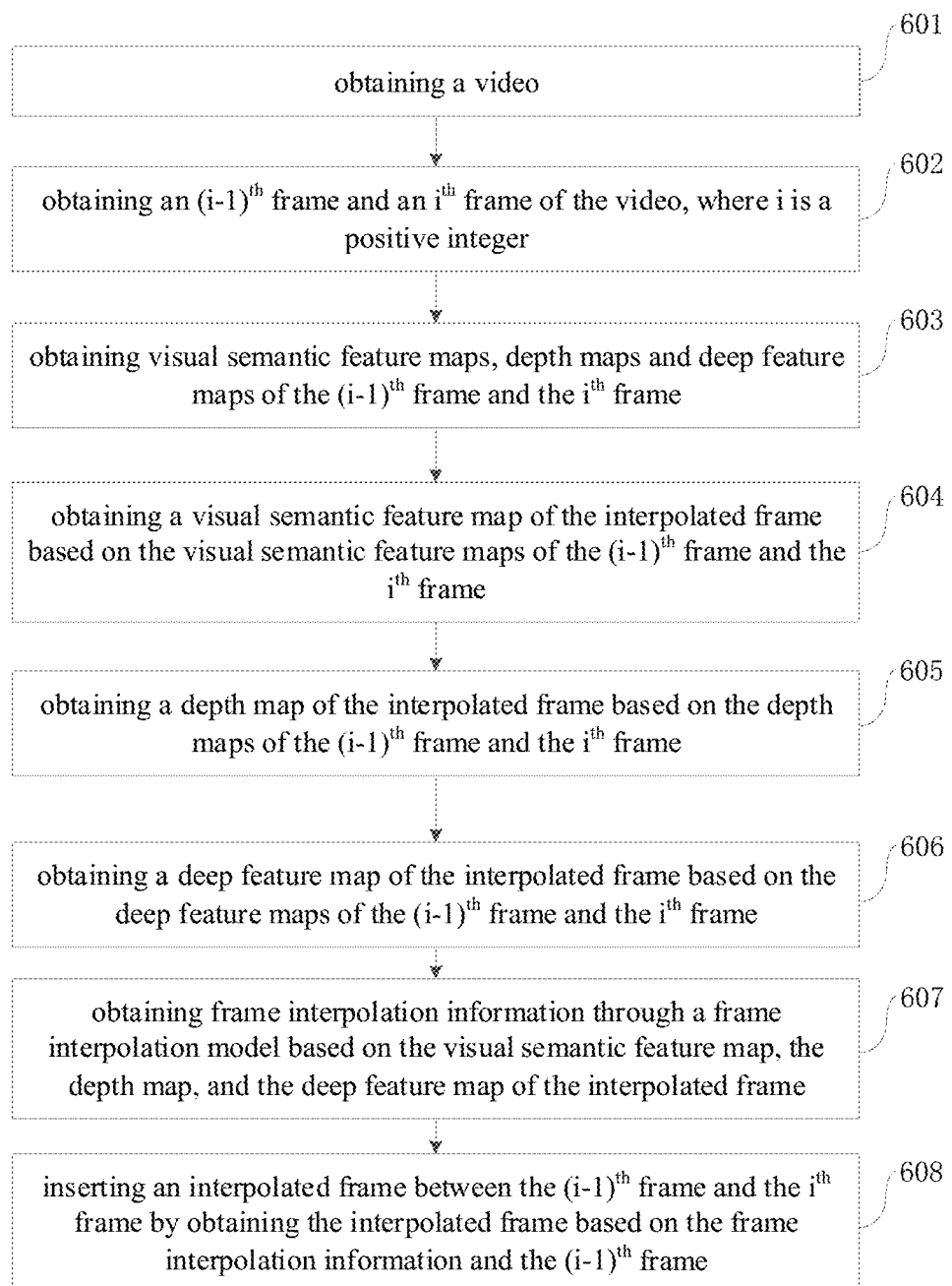
FIG. 6 is a flowchart illustrating a method for training a frame interpolation model according to embodiments of the disclosure.

In detail, as illustrated in FIG. 6, the frame interpolation model can be generated and the method may include the following.

At block 601, a video is obtained.

At block 602, an $(i-1)^{th}$ frame and an $i^{th}$ frame are obtained from the video, where i is a positive integer.

At block 603, respective visual semantic feature maps, respective depth maps and respective deep feature maps of the $(i-1)^{th}$ frame and the $i^{th}$ frame are obtained. At block 604, a visual semantic feature map of an interpolated frame is generated based on the respective visual semantic feature maps of the $(i-1)^{th}$ frame and the $i^{th}$ frame.

At block 605, a depth map of the interpolated frame is generated based on the depth map of the $(i-1)^{th}$ frame and the depth map of the $i^{th}$ frame.

At block 606, a deep feature map of the interpolated frame is generated based on the deep feature map of the $(i-1)^{th}$ frame and the deep feature map of the $i^{th}$ frame.

At block 607, frame interpolation information is generated through a frame interpolation model based on the visual semantic feature map, the depth map, and the deep feature map of the interpolated frame.

In some embodiments, the frame interpolation model may be trained by obtaining sample videos; obtaining a $(t-1)^{th}$ frame, a $t^{th}$ frame and a $(t+1)^{th}$ frame of a sample video, where t is a positive integer; obtaining respective visual semantic feature maps and respective depth maps of the $(t-1)^{th}$ frame, the $t^{th}$ frame and the $(t+1)^{th}$ frame; and using the visual semantic feature maps and depth maps of the $(t-1)^{th}$ frame and the $(t+1)^{th}$ frame as training data and using the $t^{th}$ frame as a target interpolated frame.

In some embodiments of the disclosure, the server may be configured to obtain sample videos. For example, the sample videos can be professional training videos provided by the engineer or training videos for the target video on which the video frame interpolation is performed. Therefore, the trained frame interpolation model may better execute the video frame interpolation task.

In some embodiments, descriptions of blocks 601 to 608 are similar to descriptions of blocks 501 to 508 in FIG. 5, which are not repeated here.

At block 608, an interpolated frame between the $(i-1)^{th}$ frame and the $i^{th}$ frame is generated based on the frame interpolation information and the $(i-1)^{th}$ frame, and the interpolated frame is inserted between the $(i-1)^{th}$ frame and the $i^{th}$ frame.

The training process of the frame interpolation model will be described below with reference to FIG. 7

Figure 7:
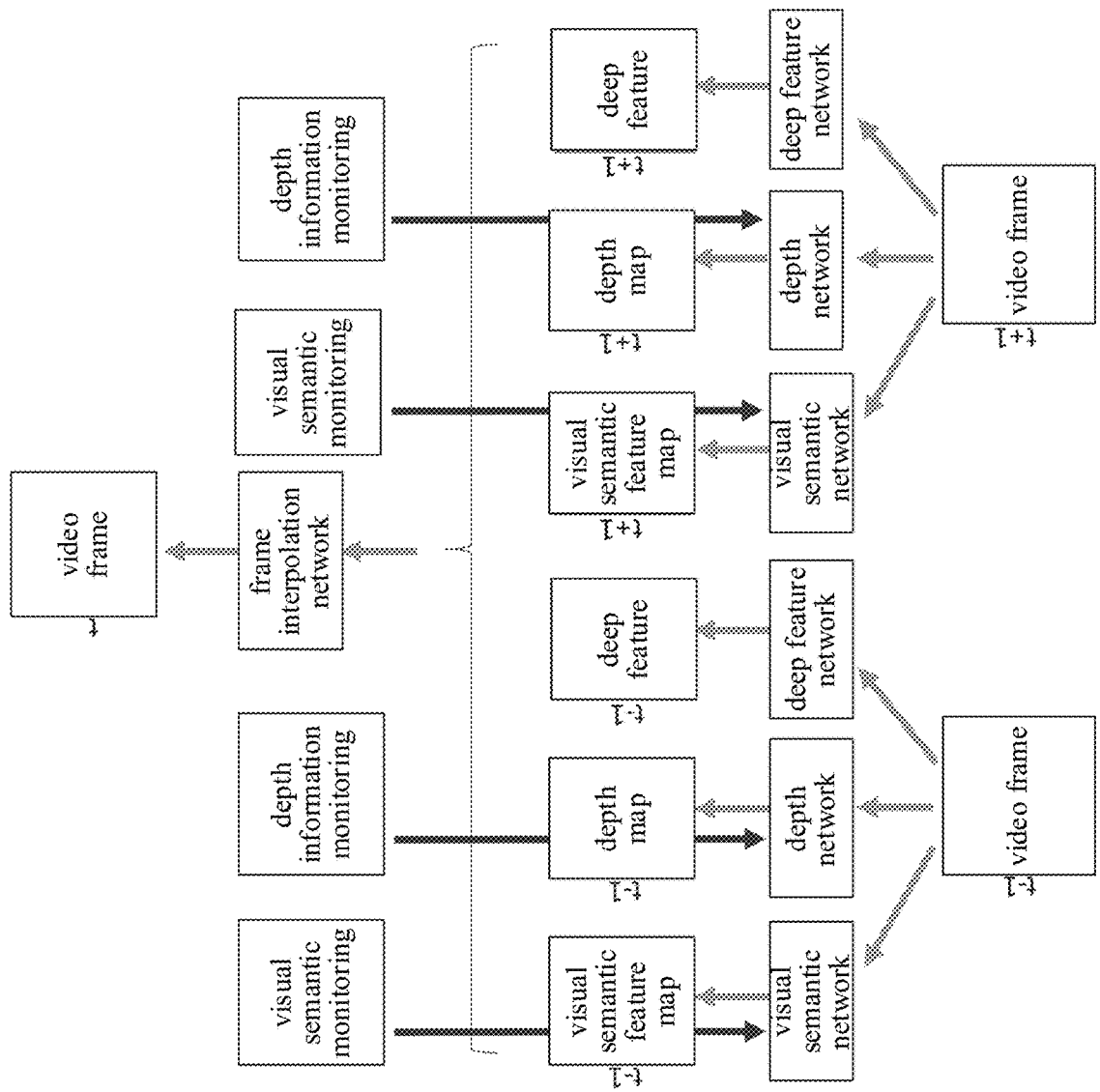
FIG. 7 is a schematic diagram of training a frame interpolation model according to embodiments of the disclosure.

As illustrated in FIG. 7, the server is configured to obtain the sample videos and obtain three adjacent frames in a target video, that is, the $(t-1)^{th}$ frame, the $t^{th}$ frame and the $(t+1)^{th}$ frame. The server is configured to obtain the respective visual semantic feature maps and the respective depth maps of the $(t-1)^{th}$ frame, the $t^{th}$ frame and the $(t+1)^{th}$ frame through a visual semantic network and a depth network used for training. A visual semantic monitoring program and a depth monitoring program in the server are configured to supervise the visual semantic feature maps and depth maps of the $(t-1)^{th}$ frame and the $(t+1)^{th}$ frame to ensure the accuracies of the visual semantic feature maps and the depth maps of the $(t-1)^{th}$ frame and the $(t+1)^{th}$ frame. The server is configured to input the visual semantic feature maps and depth maps of the $(t-1)^{th}$ frame and the $(t+1)^{th}$ frame to the frame interpolation model and use the $t^{th}$ frame as the target interpolated frame to train the frame interpolation model. For example, the visual semantic feature maps and the depth maps of the $(t-1)^{th}$ frame and the $(t+1)^{th}$ frame are compared respectively with the visual semantic feature map and the depth map of the $t^{th}$ frame to determine a change in the object position and a change in the scene from a previous frame of the $t^{th}$ frame and a latter frame of the $t^{th}$ frame. The change in the object position and the change in the scene are used as training data to train the frame interpolation model, thereby improving the training effect.

As illustrated in FIG. 7, in order to further improve the effect of training the frame interpolation model, the server may be further configured to obtain respective deep feature maps of the $(t-1)^{th}$ frame, the $t^{th}$ frame and the $(t+1)^{th}$ frame through a deep feature network used for training. The visual semantic feature maps, the depth maps and the deep feature maps of the $(t-1)^{th}$ frame and the $(t+1)^{th}$ frame are input to the frame interpolation model, and the $t^{th}$ frame is used as a target interpolated frame to train the frame interpolation model. For example, the deep feature maps of the $(t-1)^{th}$ frame and the $(t+1)^{th}$ frame are compared with the deep feature map of the $t^{th}$ frame respectively to determine the overall information and detail information of each object and each scene contained in a previous frame of the $t^{th}$ frame and a latter frame of the $t^{th}$ frame. The overall information and the detail information are used as the training data to train the frame interpolation model, thereby further improving the training effect.

In some embodiments of the disclosure, the sample video may have a first frame rate, and the video may have the second frame rate, where the first frame rate is greater than the second frame rate. The video subjected to the video frame interpolation may have the first frame rate.

For example, the first frame rate may be 60 fps and the second frame rate may be 30 fps. After the video frame interpolation is performed on the video having the frame rate of 30 fps based on the method for video frame interpolation according to embodiments of the disclosure, the processed video may have the frame rate of 60 fps, thereby improving the smoothness of the video playback.

Figure 8:
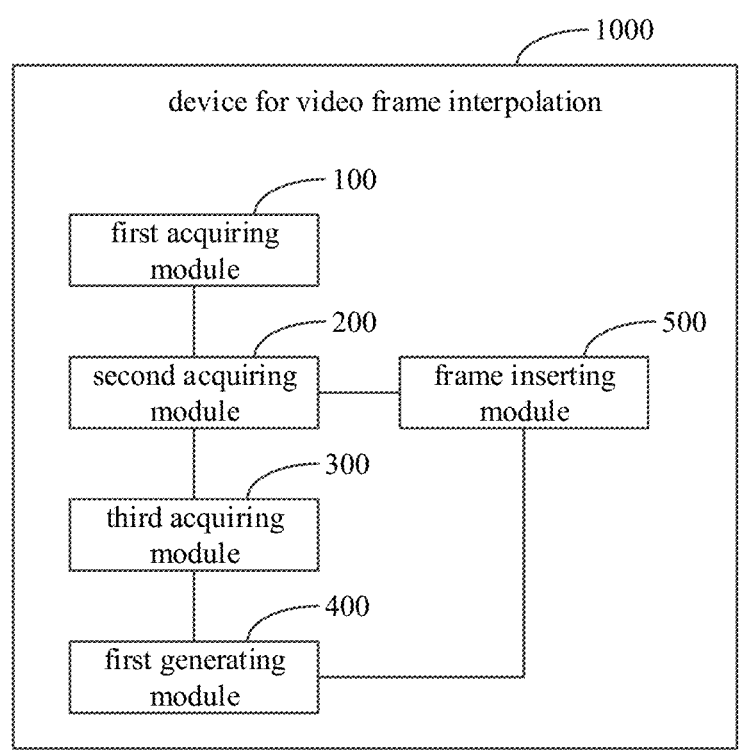
FIG. 8 is a block diagram illustrating a device for video frame interpolation according to embodiments of the disclosure.

FIG. 8 is a schematic block diagram illustrating a device for video frame interpolation according to embodiments of the disclosure.

The device for video frame interpolation according to embodiments of the disclosure may be integrated into an electronic device to generate frame interpolation information based on respective visual semantic feature maps and respective depth maps of an $(i-1)^{th}$ frame and an $i^{th}$ frame of the video, generates an interpolated frame between the $(i-1)^{th}$ frame and the $i^{th}$ frame based on the frame interpolation information and the $(i-1)^{th}$ frame, and insert the interpolated frame between the $(i-1)^{th}$ frame and the $i^{th}$ frame.

As illustrated in FIG. 8, the device 1000 for video frame interpolation may include: a first acquiring module 100, a second acquiring module 200, a third acquiring module 300, a first generating module 400, and a frame inserting module 500.

The first acquiring module 100 is configured to obtain a video. It should be noted that, the obtained video may be a target video and the user would like to perform the video frame interpolation on the target video to improve the playback smoothness.

In some embodiments of the disclosure, the electronic device may be configured to obtain the target video through a built-in first acquiring module 100. In cases that the electronic device is a video providing device, the electronic device can be configured to obtain the target video from videos stored by itself through the built-in first acquiring module 100. In cases that the electronic device is a display device, in some embodiments, the electronic device can be configured to obtain the target video from the video providing device through the built-in first acquiring module 100. For example, the electronic device may be configured to download the target video from the video providing device through the built-in first acquiring module 100 based on a uniform resource locator (URL) corresponding to the target video. Further, in cases that the electronic device is a display device, in some embodiments, the electronic device may be configured to store the target video such that the electronic device may obtain the target video from videos stored by itself through the built-in first acquiring module 100, or the electronic device can be configured to capture the target video through a built-in camera by the built-in first acquiring module 100.

The second acquiring module 200 is configured to acquire an $(i-1)^{th}$ frame and an $i^{th}$ frame from the video, where i is a positive integer. It can be understood that, the $(i-1)^{th}$ frame and the $i^{th}$ frame are selected freely from the video and the $(i-1)^{th}$ frame is adjacent to the $i^{th}$ frame.

In detail, the target video may include multiple frames, i.e., multiple single-frame images. After the first acquiring module 100 obtains the target video, the second acquiring module 200 may be configured to obtain two adjacent frames from the target video by executing a preset application, e.g., the $(i-1)^{th}$ frame and the $i^{th}$ frame.

The third acquiring module 300 is configured to acquire respective visual semantic feature maps and respective depth maps of the $(i-1)^{th}$ frame and the $i^{th}$ frame.

In some embodiments of the disclosure, the third acquiring module 300 may be configured to acquire the visual semantic feature map of the $(i-1)^{th}$ frame and the visual semantic feature map of the $i^{th}$ frame through a preset semantic segmentation network. The preset semantic segmentation network may be calibrated based on actual conditions. For example, the preset semantic segmentation network may be trained and designed using annotation data of semantic segmentation, which is not limited in the disclosure. It should be noted that, the semantic segmentation is to segment a target based on the semantic information of each pixel. Pixels with the same semantics are given the same color. Therefore, the target can be divided into different regions and the content can be identified.

In detail, the third acquiring module 300 may be configured to input the obtained $(i-1)^{th}$ frame and the $i^{th}$ frame to the preset semantic segmentation network. The preset semantic segmentation network may be configured to extract semantic segmentation information of each object and each scene contained in the $(i-1)^{th}$ frame and the $i^{th}$ frame respectively to output visual semantic feature maps having the same size with original frames (i.e., $(i-1)^{th}$ frame and the $i^{th}$ frame). An element of the visual semantic feature map is a semantic label of a pixel at a corresponding position in the original frame. For example, as illustrated in FIG. 3, all cars in the original frame are painted blue, all persons are yellow, all trees are green, and all buildings are red.

It should be noted that outputting the visual semantic feature map of the same size as the original frame in embodiments is to enable the position of segmentation information (result) in the visual semantic feature map to correspond to the pixel positions in the original frame. For example, as illustrated in FIG. 3, positions of buildings in the original frame correspond to positions of pixels of red buildings in the visual semantic feature map.

In some embodiments of the disclosure, the third acquiring module 300 may be configured to acquire the depth map of the $(i-1)^{th}$ frame and the depth map of the $i^{th}$ frame through a preset depth network. The depth network may be calibrated based on actual conditions. For example, the preset depth network may be trained and designed using annotation data of depth information, which is not limited in the disclosure.

In detail, the third acquiring module 300 may be configured to input the obtained $(i-1)^{th}$ frame and the $i^{th}$ frame to the preset depth network. The preset depth network may be configured to extract the depth information of each object contained in the $(i-1)^{th}$ frame and the $i^{th}$ frame respectively to obtain depth maps having the same size as the original frames (i.e., the $(i-1)^{th}$ frame and the $i^{th}$ frame). An element in the depth map is a depth (a distance from the object to the camera) of a pixel at a corresponding position in the original frame. For example, as illustrated in FIG. 4, different colors correspond to different depths.

It should be noted that outputting the depth map of the same size as the original frames in embodiments is to enable the depth of each object in the depth map to correspond to the pixel positions of each object in the original frame.

The first generating module 400 is configured to generate frame interpolation information based on the respective visual semantic feature maps and the respective depth maps of the $(i-1)^{th}$ frame and the $i^{th}$ frame.

The frame inserting module 500 is configured to insert an interpolated frame between the $(i-1)^{th}$ frame and the $i^{th}$ frame by generating the interpolated frame based on the frame interpolation information and the $(i-1)^{th}$ frame.

In some embodiments of the disclosure, the first generating module 400 may be configured to splice and integrate the respective visual semantic feature maps and the respective depth maps of the $(i-1)^{th}$ frame and the $i^{th}$ frame together and input to a preset frame interpolation network to generate the frame interpolation information. The preset frame interpolation network can be calibrated based on actual conditions. For example, the preset frame interpolation network can be formed based on a deep convolutional network, which is not limited here.

In detail, after the third acquiring module 300 obtains the respective visual semantic feature maps and the respective depth maps of the $(i-1)^{th}$ frame and the $i^{th}$ frame, the first generating module 400 may be configured to splice and integrate the visual semantic feature maps and the depth maps of the $(i-1)^{th}$ frame and the $i^{th}$ frame to obtain spliced and integrated information. The spliced and integrated information are input the preset frame interpolation network to generate the frame interpolation information. The frame inserting module 500 may be further configured to generate the interpolated frame between the $(i-1)^{th}$ frame and the $i^{th}$ frame based on the frame interpolation information the $(i-1)^{th}$ frame, and insert the interpolated frame between the $(i-1)^{th}$ frame and the $i^{th}$ frame.

It should be noted that in some embodiments of the disclosure, using the preset frame interpolation network to generate the frame interpolation information may provide at least the following advantages.

Since the preset frame interpolation network is consisted of deep convolutional network, traditional optical flow estimation, motion compensation or other complex calculations are not contained, thereby increasing calculation efficiency.

In addition, with the preset frame interpolation network, front-back blocking relationships of objects in the video can be obtained based on the visual semantic feature maps and the depth maps, thereby effectively solving the blocking problem.

Furthermore, since the preset frame interpolation network is consisted of deep convolutional network, the receptive field is large. Further, together with the visual semantic and the depth, the preset frame interpolation network may be applicable to a situation of large changes in motion.

Moreover, the visual semantic feature map can help the preset frame interpolation network to deal with scene changes, such as camera switching, indoor and outdoor switching.

In embodiments of the disclosure, the video is obtained by the first acquiring module, the $(i-1)^{th}$ frame and the $i^{th}$ frame are obtained from the video by the second acquiring module, the respective visual semantic feature maps and the respective depth maps of the $(i-1)^{th}$ frame and the $i^{th}$ frame are obtained by the third acquiring module, the frame interpolation information is generated by the first generating module based on the respective visual semantic feature maps and the respective depth maps of the $(i-1)^{th}$ frame and the $i^{th}$ frame, and the interpolated frame is inserted by the frame inserting module between the $(i-1)^{th}$ frame and the $i^{th}$ frame by generating the interpolated frame based on the frame interpolation information and the $(i-1)^{th}$ frame. Therefore, the video frame interpolation is performed based on the visual semantic feature maps and the depth maps of the frames of the video, thereby improving the calculation efficiency, being able to solve the blocking problem and occurrence of large changes in frames, and improving the frame interpolation effect.

Figure 9:
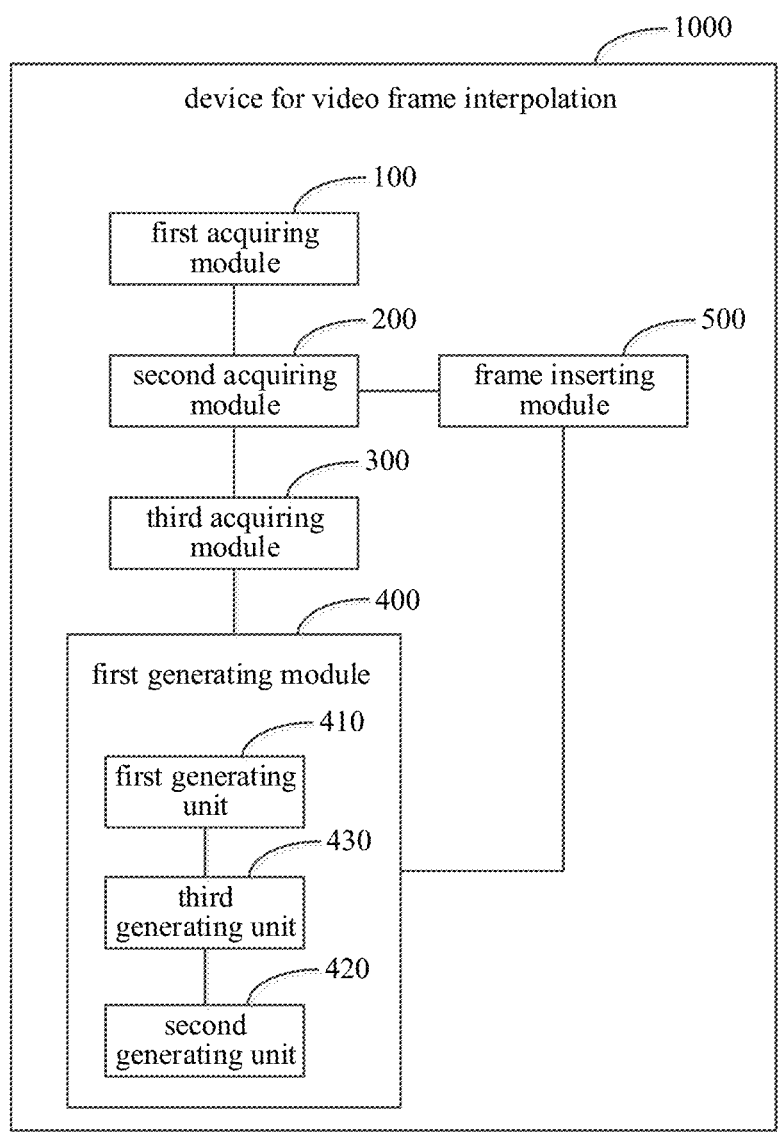
FIG. 9 is a block diagram illustrating a device for video frame interpolation according to embodiments of the disclosure.

In some embodiments of the disclosure, as illustrated FIG. 9, the first generating module 400 may include a first generating unit 410, a second generating unit 420, and a third generating unit 430.

The first generating unit 410 is configured to generate the visual semantic feature map of the interpolated frame based on the respective visual semantic feature maps of the $(i-1)^{th}$ frame and the $i^{th}$ frame.

The second generating unit 420 is configured to generate a depth map of the interpolated frame based on the respective depth maps of the $(i-1)^{th}$ frame and the $i^{th}$ frame.

The third generating unit 430 is configured to generate the frame interpolation information based on the visual semantic feature map of the interpolated frame and the depth map of the interpolated frame.

Figure 10:
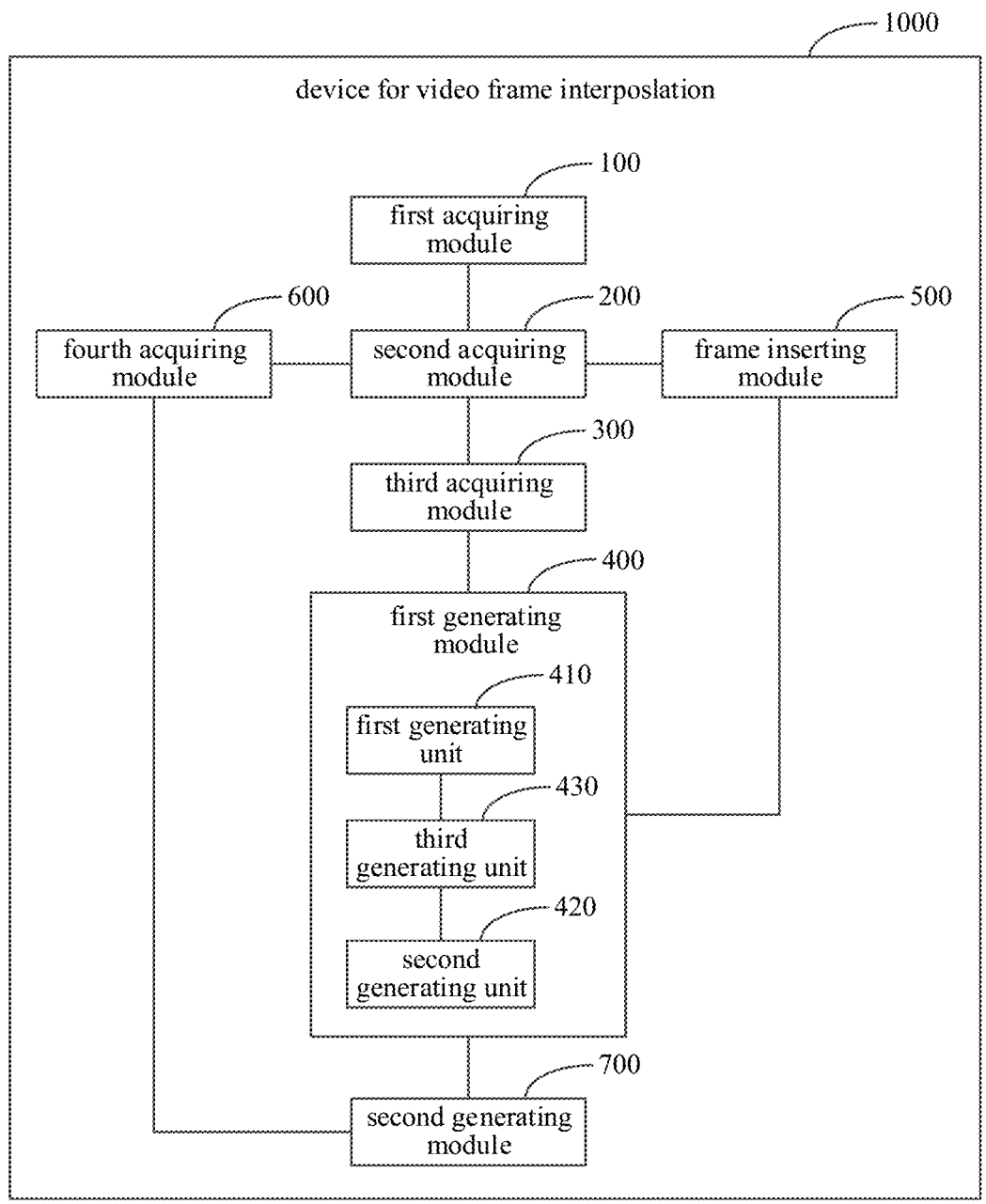
FIG. 10 is a block diagram illustrating a device for video frame interpolation according to embodiments of the disclosure.

In some embodiments of the disclosure, as illustrated in FIG. 10, the device 100 for video frame interpolation may further include a fourth acquiring module 600 and a second generating module 700.

The fourth acquiring module 600 is configured to obtain respective deep feature maps of the $(i-1)^{th}$ frame and the $i^{th}$ frame.

The second generating module 700 is configured to generate a deep feature map of the interpolated frame based on respective deep feature maps of the $(i-1)^{th}$ frame and the $i^{th}$ frame. The frame interpolation information further includes the deep feature map of the interpolated frame.

Figure 11:
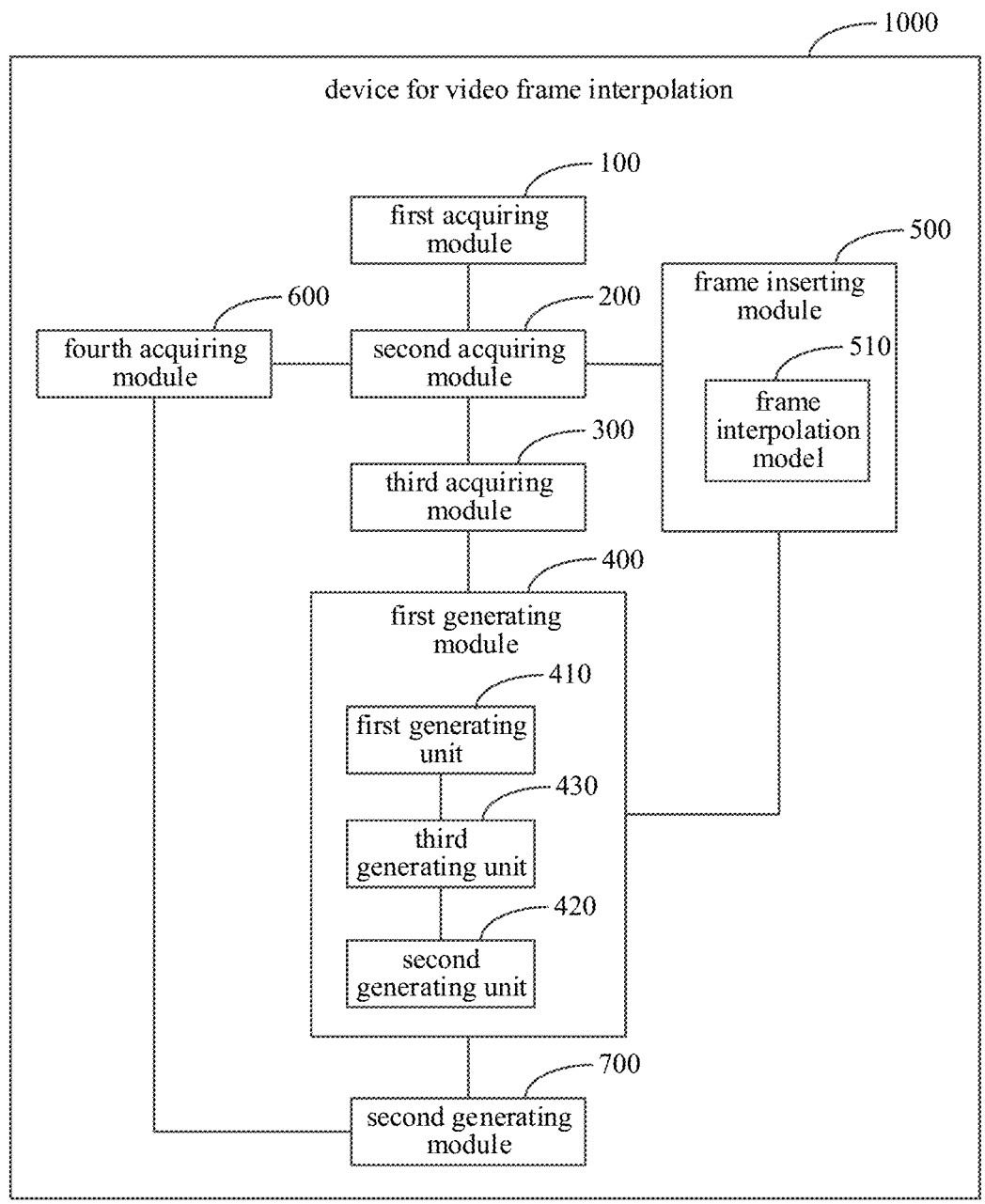
FIG. 11 is a block diagram illustrating a device for video frame interpolation according to embodiments of the disclosure.

In some embodiments of the disclosure, as illustrated in FIG. 11, the frame inserting module 500 may include a frame interpolation model 510. The frame interpolation information of the interpolated frame may be generated by the frame interpolation model 510.

Figure 12:
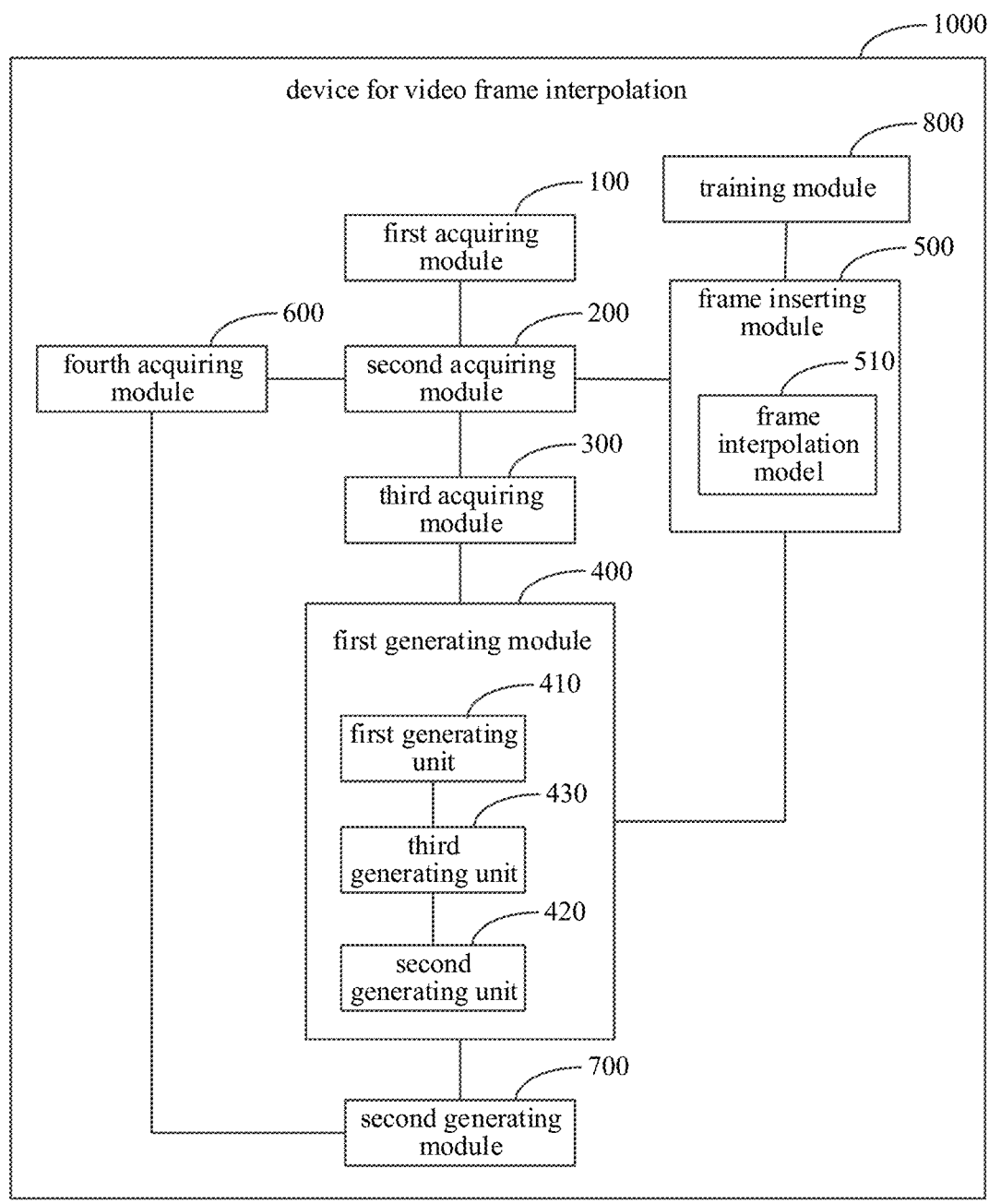
FIG. 12 is a block diagram illustrating a device for video frame interpolation according to embodiments of the disclosure.
Figure 13:
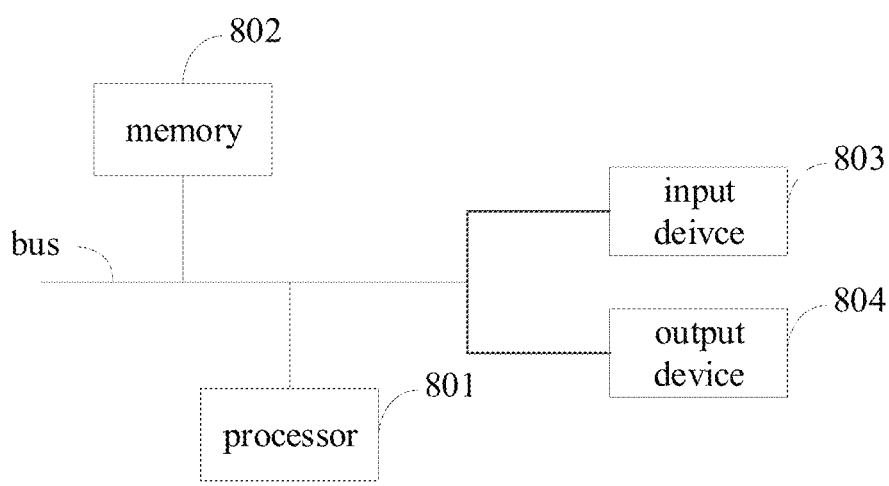
FIG. 13 is a block diagram illustrating an electronic device for implementing a method for video frame interpolation according to embodiments of the disclosure.

In some embodiments of the disclosure, as illustrated in FIG. 12, the device for video frame interpolation may further include a training module 800 of the frame interpolation model. The training module 800 is configured to obtain sample videos, obtain a $(t-1)^{th}$ frame, a $t^{th}$ frame and a $(t+1)^{th}$ frame of a sample video, obtain respective visual semantic feature maps and respective depth maps of the $(t-1)^{th}$ frame, the $t^{th}$ frame and the $(t+1)^{th}$ frame, input the visual semantic feature maps and depth maps of the $(t-1)^{th}$ frame and the $(t+1)^{th}$ frame to the frame interpolation model to train the frame interpolation model using the $t^{th}$ frame as a target interpolated frame.

In some embodiments of the disclosure, the sample video has the first frame rate, the video has the second frame rate, where the first frame rate is greater than the second frame rate. The video subjected to the video frame interpolation may have the first frame rate.

It should be noted that the foregoing descriptions of the method for video frame interpolation according to embodiments are also applicable to the device for video frame interpolation according to embodiments, which are not repeated here.

With the device for video frame interpolation according to embodiments of the disclosure, the video is obtained by the first acquiring module, the $(i-1)^{th}$ frame and the $i^{th}$ frame are obtained from the video by the second acquiring module, the respective visual semantic feature maps and the respective depth maps of the $(i-1)^{th}$ frame and the $i^{th}$ frame are obtained by the third acquiring module, the frame interpolation information is generated by the first generating module based on the respective visual semantic feature maps and the respective depth maps of the $(i-1)^{th}$ frame and the $i^{th}$ frame, and the interpolated frame is inserted by the frame inserting module between the $(i-1)^{th}$ frame and the $i^{th}$ frame by generating the interpolated frame based on the frame interpolation information and the $(i-1)^{th}$ frame. Therefore, the video frame interpolation is performed based on the visual semantic feature maps and the depth maps of the frames of the video, thereby improving the calculation efficiency, being able to solve the blocking problem and occurrence of large changes in frames, and improving the frame interpolation effect.

Embodiments of the disclosure further provide an electronic device and a computer-readable storage medium.

FIG. 11 is a block diagram illustrating an electronic device for implementing a method for video frame interpolation according to embodiments of the disclosure. The electronic device aims to represent various forms of digital computers, such as a laptop computer, a desktop computer, a workstation, a personal digital assistant, a server, a blade server, a mainframe computer and other suitable computers. The electronic device may also represent various forms of mobile devices, such as a personal digital processing, a cellular phone, a smart phone, a wearable device and other similar computing devices. The components, connections and relationships of the components, and functions of the components illustrated herein are merely examples, and are not intended to limit the implementation of the disclosure described and/or claimed herein.

As illustrated in FIG. 11, the electronic device includes: one or more processors 801, a memory 802, and interfaces for connecting various components, including a high-speed interface and a low-speed interface. Various components are connected to each other with different buses, and may be mounted on a common main board or mounted in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if necessary. Similarly, multiple electronic devices may be connected, and each electronic device provides a part of necessary operations (for example, as a server array, a group of blade servers, or a multiprocessor system). In FIG. 11, one processor 801 is taken as an example.

The memory 802 is a non-transitory computer-readable storage medium according to embodiments of the disclosure. The memory is configured to store instructions executable by at least one processor, to cause the at least one processor to execute a method for video frame interpolation according to embodiments of the disclosure. The non-transitory computer-readable storage medium according to embodiments of the disclosure is configured to store computer instructions. The computer instructions are configured to enable a computer to execute a method for video frame interpolation according to embodiments of the disclosure.

As the non-transitory computer-readable storage medium, the memory 802 may be configured to store non-transitory software programs, non-transitory computer executable programs and modules, such as program instructions/modules (such as, a first acquiring module 100, a second acquiring module 200, a third acquiring module 300, a first generating module 400, and a frame inserting module 200) corresponding to a method for video frame interpolation according to embodiments of the disclosure. The processor 801 executes various functional applications and data processing of the server by operating non-transitory software programs, instructions and modules stored in the memory 802, that is, implements a method for video frame interpolation according to embodiments of the disclosure.

The memory 802 may include a storage program region and a storage data region. The storage program region may store an application required by an operating system and at least one function. The storage data region may store data created by implementing the method for video frame interpolation through the electronic device. In addition, the memory 802 may include a high-speed random-access memory and may also include a non-transitory memory, such as at least one disk memory device, a flash memory device, or other non-transitory solid-state memory device. In some embodiments, the memory 802 may optionally include memories remotely located to the processor 801 which may be connected to the electronic device configured to implement a method for video frame interpolation via a network. Examples of the above network include, but are not limited to, the Internet, an intranet, a local area network, a mobile communication network and combinations thereof.

The electronic device configured to implement a method for video frame interpolation may also include: an input device 803 and an output device 804. The processor 801, the memory 802, the input device 803, and the output device 804 may be connected through a bus or in other means. In FIG. 11, the bus is taken as an example.

The input device 803 may be configured to receive inputted digitals or character information, and generate key signal input related to user setting and function control of the electronic device configured to implement a method for video frame interpolation, such as a touch screen, a keypad, a mouse, a track pad, a touch pad, an indicator stick, one or more mouse buttons, a trackball, a joystick and other input device. The output device 804 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be a touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general-purpose programmable processor, may receive data and instructions from a storage system, at least one input device and at least one output device, and may transmit the data and the instructions to the storage system, the at least one input device and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as machine readable signals. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components, or the front-end component. Components of the system may be connected to each other through digital data communication in any form or medium (such as, a communication network). Examples of the communication network include a local area network (LAN), a wide area networks (WAN), and the Internet.

The computer system may include a client and a server. The client and the server are generally remote from each other and usually interact via the communication network. A relationship between the client and the server is generated by computer programs operated on a corresponding computer and having a client-server relationship with each other.

According to embodiments of the disclosure, the video frame interpolation is performed based on the visual semantic feature maps and the depth maps of the video frames. Therefore, the calculation efficiency is improved. In addition, the blocking problem and a situation of large changes in frame content may be solved, thereby improving the effect of the video frame interpolation and further improving the smoothness of the video playback.

It should be understood that, steps may be reordered, added or deleted by utilizing flows in the various forms illustrated above. For example, the steps described in the disclosure may be executed in parallel, sequentially or in different orders, so long as desired results of the technical solution disclosed by the disclosure may be achieved without limitation herein.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:

1. A method for video frame interpolation, comprising:
    obtaining a video;
    obtaining an $(i-1)^{th}$ frame and an $i^{th}$ frame of the video, where i is a positive integer;
    obtaining visual semantic feature maps and depth maps of the $(i-1)^{th}$ frame and the $i^{th}$ frame;
    obtaining frame interpolation information based on the visual semantic feature maps and the depth maps of the $(i-1)^{th}$ frame and the $i^{th}$ frame; and
    inserting an interpolated frame between the $(i-1)^{th}$ frame and the $i^{th}$ frame by obtaining the interpolated frame based on the frame interpolation information and the $(i-1)^{th}$ frame;
    wherein obtaining the frame interpolation information comprises:
    obtaining a visual semantic feature map of the interpolated frame based on the visual semantic feature maps of the $(i-1)^{th}$ frame and the $i^{th}$ frame;
    obtaining a depth map of the interpolated frame based on the depth maps of the $(i-1)^{th}$ frame and the $i^{th}$ frame; and
    obtaining the frame interpolation information based on the visual semantic feature map of the interpolated frame and the depth map of the interpolated frame.

2. The method of claim 1, further comprising:
    obtaining deep feature maps of the $(i-1)^{th}$ frame and the $i^{th}$ frame; and obtaining a deep feature map of the interpolated frame based on the deep feature maps of the $(i-1)^{th}$ frame and the $i^{th}$ frame, wherein the frame interpolation information further comprises the deep feature map of the interpolated frame.

3. The method of claim 2, further comprising:
obtaining the frame interpolation information of the interpolated frame through a frame interpolation model.

4. The method of claim 3, wherein the frame interpolation model is trained by:
obtaining sample videos;
obtaining a $(t-1)^{th}$ frame, a $t^{th}$ frame, and a $(t+1)^{th}$ frame of the video;
obtaining visual semantic feature maps and depth maps of the $(t-1)^{th}$ frame, the $t^{th}$ frame, and the $(t+1)^{th}$ frame; and
inputting the visual semantic feature maps and the depth maps of the $(t-1)^{th}$ frame and the $(t+1)^{th}$ frame into a frame interpolation model to train the frame interpolation model using the $t^{th}$ frame as a target interpolated frame.

5. The method of claim 4, wherein the sample video has a first frame rate, the video has a second frame rate, and the video subjected to the video frame interpolation has the first frame rate, where the first frame rate is greater than the second frame rate.

6. The method of claim 1, wherein obtaining a visual semantic feature map comprises:
extracting semantic segmentation information of objects and scenes contained in the $(i-1)^{th}$ frame and the $i^{th}$ frame through a preset semantic segmentation network; and
obtaining the visual semantic feature map of the $(i-1)^{th}$ frame having a same size as the $(i-1)^{th}$ frame and the visual semantic feature map of the $i^{th}$ frame having a same size as the $i^{th}$ frame output by the preset semantic segmentation network.

7. The method of claim 1, wherein obtaining a depth map comprises:
extracting depth information of objects contained in the $(i-1)^{th}$ frame and the $i^{th}$ frame through a preset depth network; and
obtaining the depth map of the $(i-1)^{th}$ frame having a same size as the $(i-1)^{th}$ frame and the depth map of the $i^{th}$ frame having a same size as the $i^{th}$ frame output by the preset depth network.

8. The method of claim 2, wherein obtaining a deep feature map comprises:
extracting deep features of objects and scenes contained in $(i-1)^{th}$ frame and the $i^{th}$ frame through a preset deep neural network; and
obtaining the deep feature map of the $(i-1)^{th}$ frame having a same size as the $(i-1)^{th}$ frame and the deep feature map of the $i^{th}$ frame having a same size as the $i^{th}$ frame output by the preset deep neural network.

9. An electronic device, comprising:
at least one processor; and
a memory, communicatively coupled to the at least one processor;
wherein the memory is configured to store instruction executable by the at least one processor, and when the instructions are executed by the at least one processor, the at least one processor is configured to:
obtain a video;
obtain an $(i-1)^{th}$ frame and an $i^{th}$ frame of the video, where i is a positive integer;
obtain visual semantic feature maps and depth maps of the $(i-1)^{th}$ frame and the $i^{th}$ frame;
obtain frame interpolation information based on the visual semantic feature maps and the depth maps of the $(i-1)^{th}$ frame and the $i^{th}$ frame; and
insert an interpolated frame between the $(i-1)^{th}$ frame and the $i^{th}$ frame by obtaining the interpolated frame based on the frame interpolation information and the $(i-1)^{th}$ frame;
wherein the at least one processor is further configured to:
obtain a visual semantic feature map of the interpolated frame based on the visual semantic feature maps of the $(i-1)^{th}$ frame and the $i^{th}$ frame;
obtain a depth map of the interpolated frame based on the depth maps of the $(i-1)^{th}$ frame and the $i^{th}$ frame; and
obtain the frame interpolation information based on the visual semantic feature map of the interpolated frame and the depth map of the interpolated frame.

10. The electronic device of claim 9, wherein the at least one processor is further configured to:
obtain deep feature maps of the $(i-1)^{th}$ frame and the $i^{th}$ frame; and
obtain a deep feature map of the interpolated frame based on the deep feature maps of the $(i-1)^{th}$ frame and the $i^{th}$ frame, wherein the frame interpolation information further comprises the deep feature map of the interpolated frame.

11. The electronic device of claim 10, wherein the at least one processor is further configured to:
obtain the frame interpolation information of the interpolated frame through a frame interpolation model.

12. The electronic device of claim 11, wherein the frame interpolation model is trained by:
obtaining sample videos;
obtaining a $(t-1)^{th}$ frame, a $t^{th}$ frame, and a $(t+1)^{th}$ frame of the video;
obtaining visual semantic feature maps and depth maps of the $(t-1)^{th}$ frame, and the $(t+1)^{th}$ frame; and
inputting the visual semantic feature maps and the depth maps of the $(t-1)^{th}$ frame and the $(t+1)^{th}$ frame into a frame interpolation model to train the frame interpolation model using the $t^{th}$ frame as a target interpolated frame.

13. The electronic device of claim 12, wherein the sample video has a first frame rate, the video has a second frame rate, and the video subjected to the video frame interpolation has the first frame rate, where the first frame rate is greater than the second frame rate.

14. A non-transitory computer-readable storage medium, having computer instructions stored thereon, wherein the computer instructions are configured to cause a computer to execute a method for video frame interpolation, the method comprising:
obtaining a video;
obtaining an $(i-1)^{th}$ frame and an $i^{th}$ frame of the video, where i is a positive integer;
obtaining visual semantic feature maps and depth maps of the $(i-1)^{th}$ frame and the $i^{th}$ frame;
obtaining frame interpolation information based on the visual semantic feature maps and the depth maps of the $(i-1)^{th}$ frame and the $i^{th}$ frame; and
inserting an interpolated frame between the $(i-1)^{th}$ frame and the $i^{th}$ frame by obtaining the interpolated frame based on the frame interpolation information and the $(i-1)^{th}$ frame;
wherein obtaining the frame interpolation information comprises:

obtaining a visual semantic feature map of the interpolated frame based on the visual semantic feature maps of the $(i-1)^{th}$ frame and the $i^{th}$ frame;

obtaining a depth map of the interpolated frame based on the depth maps of the $(i-1)^{th}$ frame and the $i^{th}$ frame; and obtaining the frame interpolation information based on the visual semantic feature map of the interpolated frame and the depth map of the interpolated frame.

15. The non-transitory computer-readable storage medium of claim 14, wherein the method further comprises:

obtaining deep feature maps of the $(i-1)^{th}$ frame and the $i^{th}$ frame; and obtaining a deep feature map of the interpolated frame based on the deep feature maps of the $(i-1)^{th}$ frame and the $i^{th}$ frame, wherein the frame interpolation information further comprises the deep feature map of the interpolated frame.

16. The non-transitory computer-readable storage medium of claim 15, wherein the method further comprises:

obtaining the frame interpolation information of the interpolated frame through a frame interpolation model.

17. The non-transitory computer-readable storage medium of claim 16, wherein the frame interpolation model is trained by:

obtaining sample videos;

obtaining a $(t-1)^{th}$ frame, a $t^{th}$ frame, and a $(t+1)^{th}$ frame of the video;

obtaining visual semantic feature maps and depth maps of the $(t-1)^{th}$ frame, the $t^{th}$ frame, and the $(t+1)^{th}$ frame; and inputting the visual semantic feature maps and the depth maps of the $(t-1)^{th}$ frame and the $(t+1)^{th}$ frame into a frame interpolation model to train the frame interpolation model using the $t^{th}$ frame as a target interpolated frame.

* * * * *